United States Patent

Sugita

Patent Number: 5,812,543
Date of Patent: Sep. 22, 1998

[54] MOBILE COMMUNICATION METHOD AND SYSTEM

[75] Inventor: Takehiro Sugita, Kanagawa, Japan

[73] Assignee: Sony Corporation, Tokyo, Japan

[21] Appl. No.: 715,431

[22] Filed: Sep. 18, 1996

[30] Foreign Application Priority Data

Sep. 20, 1995 [JP] Japan ................................ 7-266402

[51] Int. Cl.$^6$ .................................................. H04B 7/216
[52] U.S. Cl. .......................... 370/335; 370/342; 370/441; 455/426; 455/462; 455/465
[58] Field of Search ..................... 455/422, 426, 455/462, 465; 370/331, 335, 342, 441; 379/58–59, 61

[56] References Cited

U.S. PATENT DOCUMENTS 5,127,042  6/1992  Gillig et al. .............................. 379/59
5,574,976  11/1996  Schellinger ............................. 455/426
5,659,598  8/1997  Byrne et al. ............................ 455/426

Primary Examiner—Chi H. Pham
Assistant Examiner—Ricky Ngo
Attorney, Agent, or Firm—Jay H. Maioli

[57] ABSTRACT

A mobile communication system in which a mobile unit of a mobile communication system operating under the CDMA system may be utilized indoors as a slave unit of the cordless telephone. The communication system operating under the CDMA system includes a plurality of fixed stations 3 connected to a subscriber network and designed to send a PN code shorter in period than a pilot PN code sent from a base station 1, and the identification information for the fixed stations 3, as a control channel, and a mobile unit 2 for receiving the identification information in the control channel received from the fixed station and for making or accepting a call via the fixed station 3 and via the base station 1 if the mobile unit 2 has identified the fixed station to be its own fixed station based on the identification information.

22 Claims, 10 Drawing Sheets

MOBILE COMMUNICATION METHOD AND SYSTEM

BACKGROUND OF THE INVENTION

1. Field of the Invention

This invention relates to a method and a system for mobile communication, a fixed station and a mobile station. More particularly, it relates to a cellular system employing the code division multiple access (CDMA) system or a system for indoor utilization of a mobile station of a licensed PCS.

2. Description of the Related Art

The mobile communication employing the CDMA system, or a so-called cellular system, has a system capacity about ten times as large as that of the conventional analog mobile communication system, and is now coming into widespread use in the licensed personal communication service (PCS).

In a digital cellular employing the CDMA system, a base station 1 and a plurality of mobile units are interconnected by a radio network of a pre-set band, as shown in FIG. 1. As a so-called forward link from the base station 1 to the mobile units 2, a pilot channel, a sink channel, a paging channel and a traffics channel are used.

The pilot channel is a channel for repetitive transmission of a pilot PN code and is used for acquisition and maintenance of synchronization at the mobile unit 2 and for clock regeneration.

The sync channel is a channel used for matching the time and the PN code, that is a so-called long code, between the base station 1 and the mobile unit 2.

The paging channel is a channel used for transmitting the information required for hand-off, calling information for the mobile unit 2 on termination or the information on traffics channel allocation.

The traffics channel is a channel used for transmitting the actual speech information (speech data) or data.

Referring to FIG. 2, the base station 1 includes a PN code generator 101 for generating the PN code, Walsh code generators $102_0$ to $102_n$, and multipliers $103_0$ to $103_n$ for multiplying the PN code from the PN code generator 101 with the Walsh codes from the Walsh code generators $102_0$ to $102_n$, where n may, for example, be equal to 63. The base station 1 also includes multipliers $104_1$ to $104_n$ for multiplying outputs of the multipliers $103_1$ to $103_n$ with the outputs of the multipliers $103_1$ to $103_n$ and data, and a channel adder 105 for summing the outputs of the multipliers $104_1$ to $104_n$.

The multiplier $103_0$ multiplies the PN code from the PN code generator 101 with the Walsh code 0, i.e., all-zero, which is the orthogonal code from the Walsh code generator $102_0$, and routes the resulting PN code to the adder 105 as pilot channel data.

The multiplier $103_{32}$ multiplies the PN code from the PN code generator 101 with the Walsh code 32 from the Walsh code generator $102_{32}$, while the multiplier $104_{32}$ multiplies an output of the multiplier $103_{32}$ with data, such as time information, supplied via terminal 106, and routes the resulting data to the adder 105 as sync channel data.

The multiplier $103_1$ multiplies the PN code from the PN code generator 101 with the Walsh code 1 from the Walsh code generator $102_1$, while the multiplier $104_1$ multiplies the output of the multiplier $103_1$ with, for example, the allocation information for the paging channel supplied via a terminal 107, and routes the resulting data to the adder 105 as the paging channel data. It is possible to provide up to seven channels at the maximum for constituting the paging channel data.

The multiplier $103_i$ multiplies the PN code from the PN code generator 101 with the Walsh code i from the Walsh code generator $102_i$, while the multiplier $104_i$ multiplies an output of the multiplier $103_i$ with, for example, speech data supplied via a terminal $108_i$, and routes the resulting data to the adder 105 as traffics channel data.

The adder 105 sums the pilot channel data from the multiplier $103_0$, sync channel data from the multiplier $104_{32}$, paging channel data from the multiplier $104_1$, and the traffics channel data from the multipliers $103_i$, and routes the resulting data via a terminal 109 to, for example, a two-phase shift keying modulator, not shown.

When the synchronization (timing) of the PN code of the mobile station 2 is maintained, using, for example, the pilot channel, and the shift quantity of the PN code is notified to the mobile station 2, using the sync channel, calling responsive to call acceptance and traffics channel allocation are performed, using the paging channel. That is, actual talk over the telephone is made by the CDMA system, using the traffics channel. Meanwhile, an access channel for controlling the making of a call or accepting a call, and a traffics channel for having a talk over the telephone, are used as a so-called reverse link from the mobile unit 2 to the base station 1.

In the cellular system or the licensed PCS, it would be highly convenient that, when the mobile unit (mobile terminal) is situated indoors, as shown in FIG. 1, the mobile unit 2 can be used as a slave unit in the so-called cordless telephone, that is as a slave unit for a master unit connected to the subscriber network (home base station), in order to exploit the subscriber network for which the charging for the call is low. Stated differently, a demand has been raised for the mobile unit 2 and the home base station 3 having the above function.

The home base station is now coming into use insofar as time division multiple access (TDMA) system is concerned. The TDMA system is in operation under the same system as the cellular system by searching for void channels not used as the cellular.

If, in the system employing the home base station of the CDMA system, the cellular mode is automatically changed over to the cordless telephone mode, it is necessary for the mobile unit to search the home base station periodically. In such case, however, the following problems arise.

In the cellular of the CDMA system, the mobile unit periodically receives the paging channel to check for the possible presence of termination without regard to system types. Thus, it is necessary for the mobile unit to search the home base station in interstitial time periods.

However, it is extremely difficult to realize synchronization between the base station and the home base station. Moreover, the pilot PN code period used in the CDMA system is extremely long, being $2^{15}$, such that it takes prolonged time to find the correlation for all timings for detecting the pilot PN code. For example, if the length of correlation is 64 chips, it takes time on the order of 2 seconds before arriving at the results of correlation for all timings. Since the length of correlation is several times as long as the above value, it takes an extremely long time before detecting the pilot PN code. Thus, if the home base station transmits the pilot PN signal (code) and the mobile unit attempts to detect the transmitted code, it is difficult to search the home base station during the above period.

If the home base station keeps on transmitting the pilot PN signal, it may prove to be a hindrance to other systems in operation. It is desirable to reduce the transmission time ratio by burst-like transmission, if this is possible.

SUMMARY OF THE INVENTION

It is therefore an object of the present invention to provide a method and a system for mobile communication, a fixed station and a mobile station in which it is possible to utilize a mobile unit of the cellular system or licensed PCS employing the CDMA system as a slave unit of the cordless telephone if the mobile unit happens to be situated indoors.

In one aspect, the present invention provides a method for mobile transmission for having communication between a base station and a plurality of mobile units by a code division multiple connection system, there being a plurality of fixed stations connected to the subscriber network in association with the mobile units, wherein N periods of the PN codes shorter in period than a pilot PN code transmitted from the base station, N being not less than 1, and the identification information for identifying the fixed stations, are transmitted as a control channel, and wherein, if a fixed station has been confirmed by the mobile unit to be the fixed station associated with the mobile unit based on the identification information of the control channel received by the fixed station, a call is made or accepted via the fixed station and, if otherwise, a call is made or accepted via the base station. Thus the mobile unit can receive the control channel from the fixed station in a shorter time.

In another aspect, the present invention provides a system for mobile transmission for having communication between a base station and a plurality of mobile units by a code division multiple connection system including a plurality of fixed stations for transmitting N periods of the a PN code, shorter in period than a pilot PN code transmitted from the base station, N being not less than 1, and for transmitting the identification information for identifying the fixed stations, as a control channel, and a plurality of mobile units which, if a fixed station has been confirmed by the mobile unit to be the fixed station associated with the mobile unit based on the identification information of the control channel received by the fixed station, make or accept a call via the fixed station and, if otherwise, make or accept a call via the base station. The fixed stations are associated with the mobile units and are connected to a subscriber network.

In still another aspect, the present invention provides a fixed station in a mobile communication system designed for having communication between a base station and a plurality of mobile units by a code division multiple connection system. The fixed station has a radio communication with the mobile unit. The fixed station has PN code generating means for generating a PN code shorter in period than a pilot PN code transmitted from the base station, identification information generating means for generating the identification information for identifying the fixed stations, and control channel transmitting means for transmitting N periods of the PN code from the PN code generating means, N being not less than 1, and the identification information from the identification information generating means, as a control channel.

In yet another aspect, the present invention provides a mobile unit in a mobile communication system in which communication is made between a base station and a plurality of the mobile units by a code division multiple connection system. The mobile unit includes reception means for receiving a paging channel from the base station and for receiving N periods, N being not less than 1, of PN codes shorter in period than a pilot PN code, and the identification information for identifying a plurality of fixed stations associated with the mobile units as a control channel, PN code detection means for detecting the PN codes of the control channel received by the reception means, demodulation means for demodulating the identification information of the control channel based on the result of detection of the PN code detection means and control means managing control for making a call or accepting a call via a fixed station if the fixed station has been confirmed by the mobile unit to be the fixed station associated with the mobile unit based on the identification information from the demodulation means. Otherwise, the control means manages control for making or accepting a call via the base station.

Preferably, the fixed station transmits the control channel in a time interval shorter than the time which elapses since the end of a paging channel intermittently transmitted from the base station until the leading end of the next paging channel. Thus the mobile unit can receive the control channel in the interstitial period of reception of the paging channels.

Preferably, the fixed station varies the timing of transmitting the control channel based on random numbers. This makes it possible to avoid continuous collision of a control packet sent from a fixed station against a control packet transmitted by another fixed station.

Preferably, a plurality of the fixed stations transmit control channels of respectively different PN codes. This enables the mobile unit to use the Pn code of the control channel for identifying the associated fixed station.

Preferably, the mobile unit intermittently receives the paging channel transmitted from the base station, and the control channel from the fixed station is received during the period of not receiving the paging channel.

Preferably, the mobile unit may be adapted for receiving the control channel once for reception of one or more paging channel(s). This makes it possible to reduce power consumption otherwise increased by control channel reception.

According to the present invention, the fixed station connected to the subscriber line transmits N periods of the PN code shorter in period than the pilot PN code sent from the base station, and the identification information for identifying the fixed stations, as a control channel. If the mobile unit has identified a fixed station to be its own fixed station, based on the identification information of the control channel received from the fixed station, it makes or accepts a call via the fixed station. If otherwise, the mobile unit makes or accepts a call via the base station.

DESCRIPTION OF THE PREFERRED EMBODIMENTS

Figure 1:
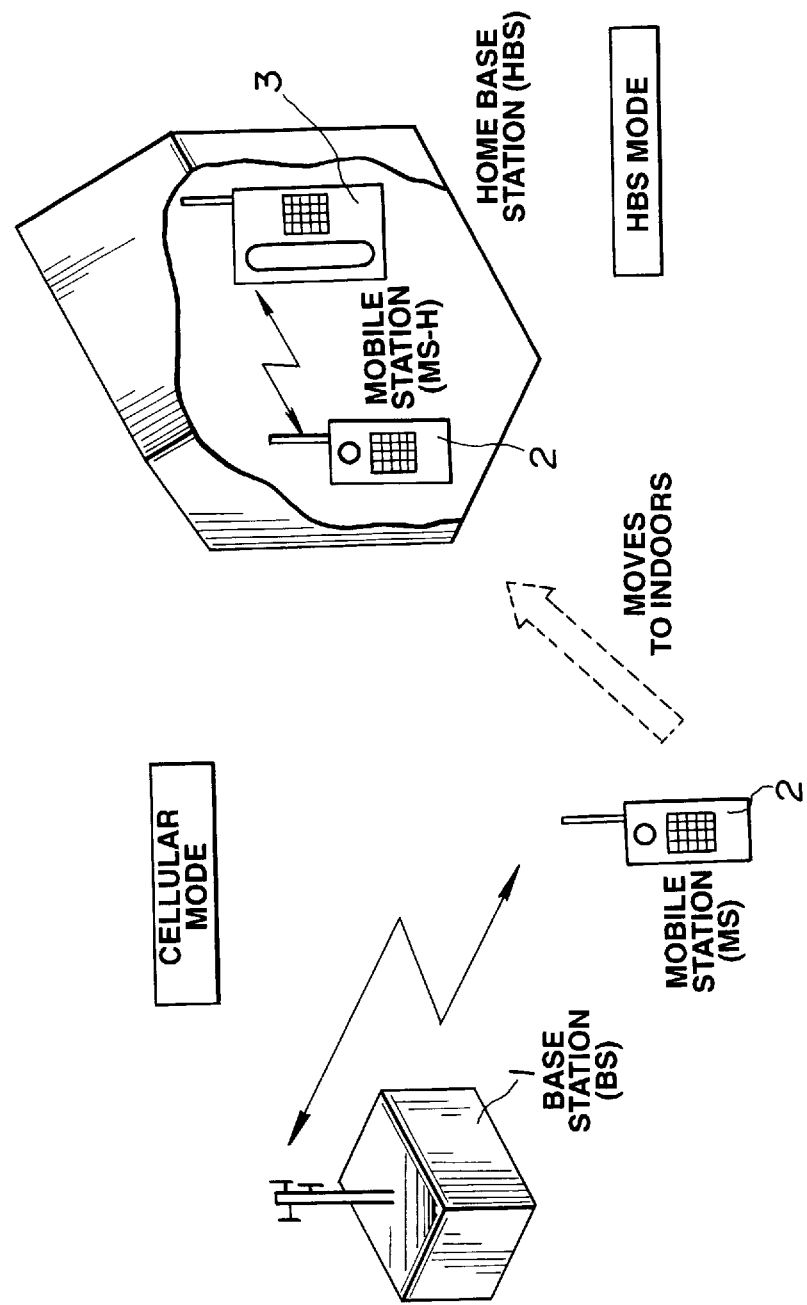
FIG. 1 s a conceptual view showing a home base station.
Figure 2:
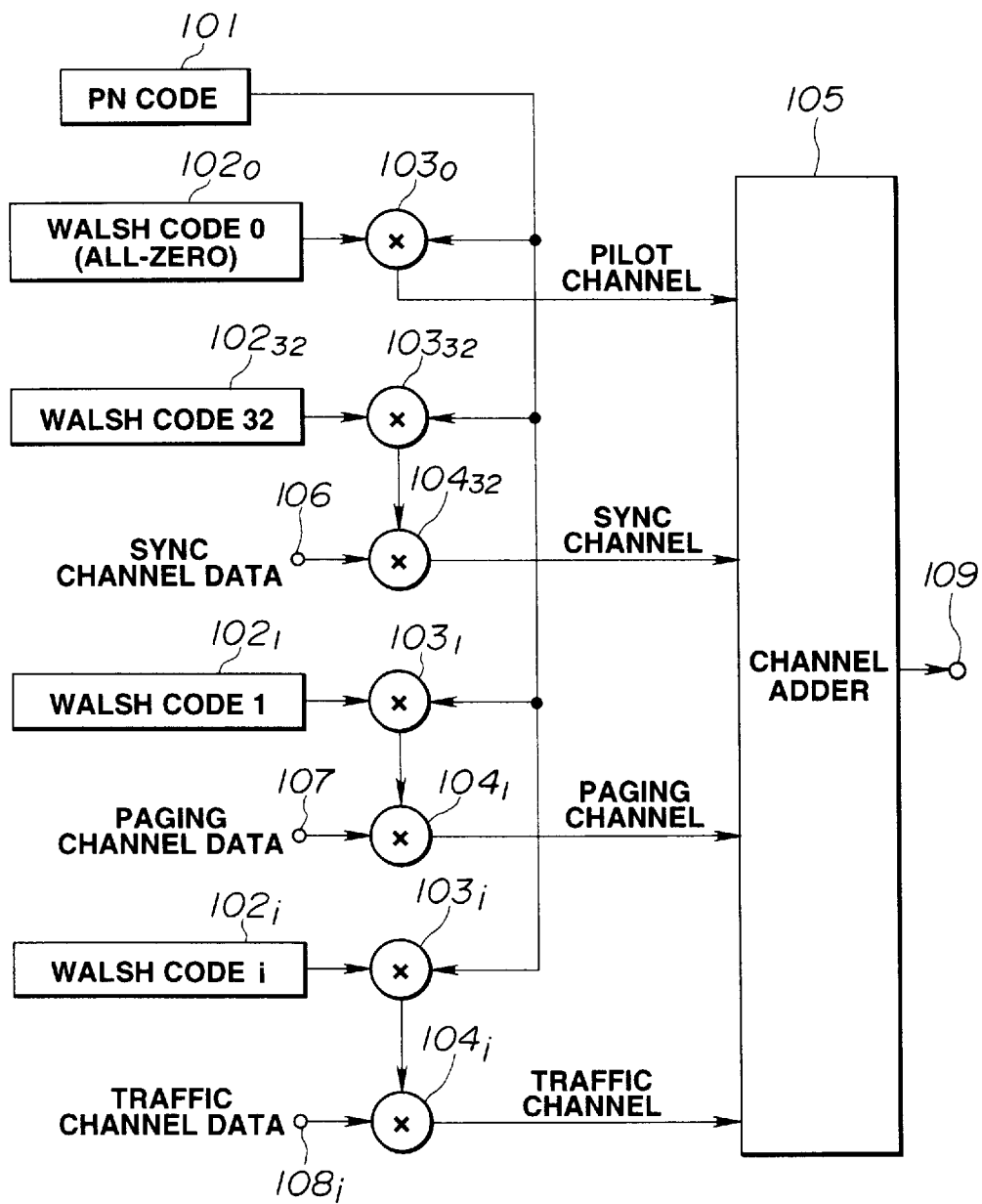
FIG. 2 is a block diagram showing an illustrative arrangement of a transmission system of a base station.

Referring to the drawings, preferred embodiments of the method and the system for mobile communication, a fixed station and a mobile station.

The mobile communication system according to the present invention performs communication between a base station 1, plural mobile units 2 and a home base station (HBS) 3, as a fixed station, using the CDMA system, as shown in FIG. 1. In this system, the HBS 3, connected to the subscriber network, transmits N periods, N being not less than 1, of the PN code having a period shorter than that of the pilot PN code transmitted from the base station 1, and the identification information for identifying the HBS, as a control channel. The mobile unit 2 is responsive to the identification information for the control channel received from the HBS 3 to make a call or accept a call via the HBS 3 if the HBS 3 has been identified to be its own HBS. If otherwise, the mobile unit makes a call or accepts a call via the base station 1.

With the mobile communication system, the mobile unit 2 situated in an area capable of having communication with the HBS 3 situated indoors can be used as a slave unit of the so-called cordless telephone. At this time, the mobile unit 2 operates under an HBS mode of making or accepting a call via HBS 3 equivalent to the master unit connected to the subscriber network. If the mobile unit 2 is situated in an area incapable of having communication with the HBS3, it operates under a cellular mode of making or accepting a call via the base station 1.

Figure 3:
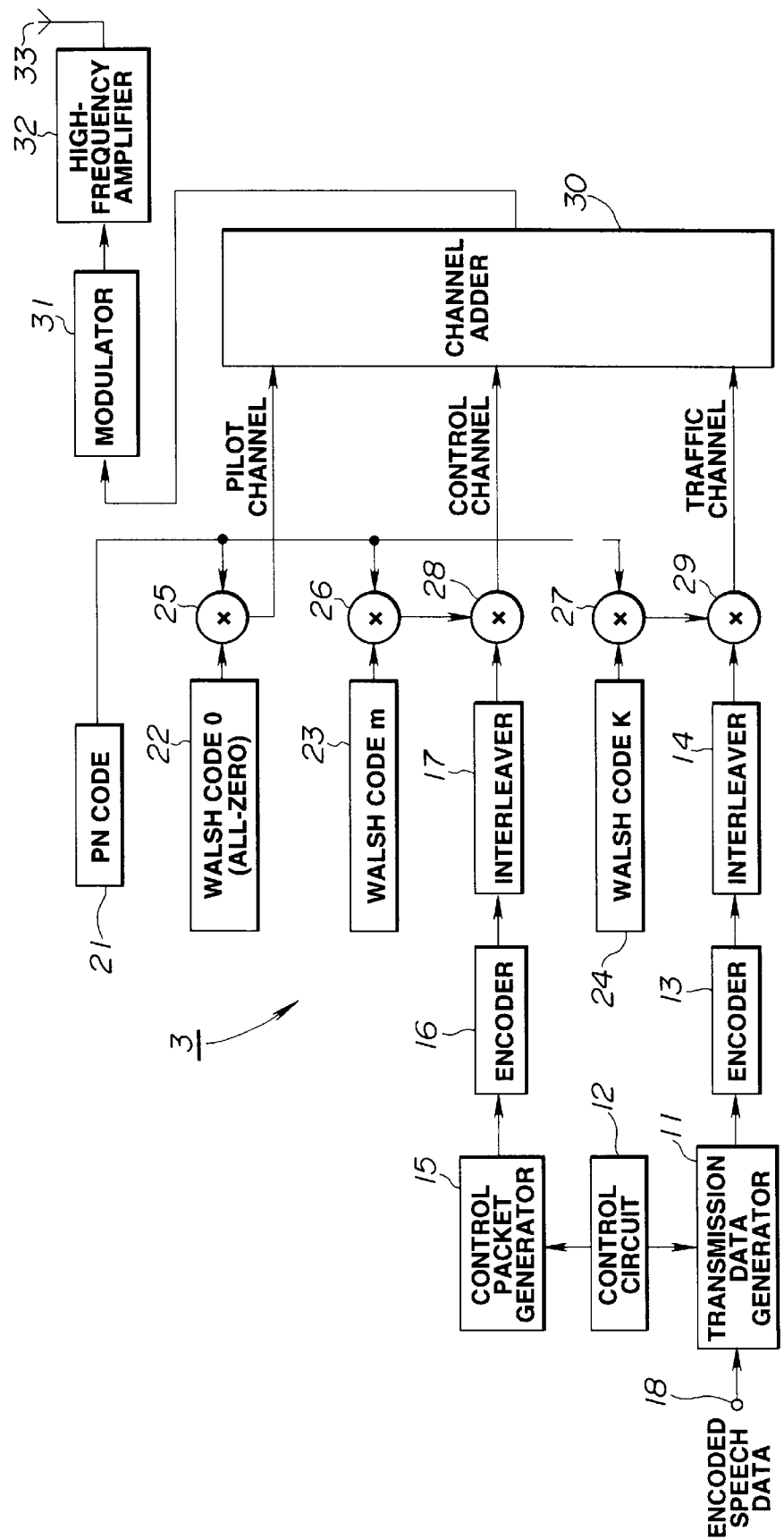
FIG. 3 is a block diagram showing an illustrative arrangement of a transmission system of a home base station embodying the present invention.

FIG. 3 shows an example of the constitution of a transmission system of the HBS 3. The HBS 3 includes a transmission data generating circuit 11 for outputting the encoded speech data in a pre-set format and a control circuit 12 for generating the identification information for identifying the home base stations 3. The HBS 3 also includes a control packet generating circuit 15 for outputting the identification from the control circuit 12 in a pre-set format and a PN code generator for generating a PN code having a period shorter than that of the pilot PN code of the paging channel transmitted from the base station. The HBS 3 also includes a plurality of, herein three, Walsh code generators 22 to 24 for generating respectively different Walsh codes and multipliers 25 to 27 for multiplying the PN codes from the PN code generator 21 with the Walsh codes from the Walsh code generators 22 to 24. The HBS 3 also includes a multiplier 28 for multiplying the identification information generated by the control circuit 12 with an output of the multiplier 26 and a multiplier 29 for multiplying the speech data outputted by the transmission data generating circuit 11 with an output of the multiplier 27. The HBS 3 additionally includes an adder 30 for summing outputs of the multipliers 25, 28, 29 and a modulator 31 for modulating an output of the channel adder 30 in accordance with a pre-set modulation system. The HBS 3 further includes a high frequency amplifier 32 for amplifying the modulated signal from the modulator 31 and an antenna 33.

When a call has been accepted via subscriber network, the control circuit 12 generates the control information for network control, such as calling responsive to accepted call, while generating the identification information for identification of the respective home base stations allocated to the home base stations 3 at a time interval shorter than the time duration as from the end of a paging channel intermittently transmitted from the base station 1 until the leading end of the next paging channel. This control information is supplied to the transmission data generating circuit 11, while the identification information is supplied to the control packet generating circuit 15.

During telephone talk, the transmission data generating circuit 11 is fed via a terminal 18 with speech data encoded by a pre-set coding rule (encoded speech data). The transmission data generating circuit 11 converts the encoded speech data and the control information for network control supplied from the control circuit 12, and routes the resulting format-converted data to a encoding circuit 13. The encoding circuit 13 encodes the format-converted encoded speech data using, for example, convolutional codes for making error correction in the mobile unit 2. An interleaving circuit 14 interleaves the ended speech data so that no burst error will be produced in the encoded speech data, and routes the encoded speech data to the multiplier 29.

On the other hand, the control packet generating circuit 15 converts the identification information proper to the HBS 3 and routes the resulting packet to an encoding circuit 16. Similarly to the encoding circuit 13, the encoding circuit 16 encodes the identification information. Likewise, the interleaving circuit 17 interleaves the encoded identification information, as in the case of the interleaving circuit 14, and routes the resulting interleaved encoded identification information to the multiplier 28.

The PN code generator 21 generates the PN code with a period equal to, for example, $2^6$, which is shorter than the time which elapses since the end of the paging channel intermittently transmitted from the base station 1 until the leading end of the next paging channel, and sends the PN code to the multipliers 25 to 27.

The Walsh code generator 22 generates the Walsh codes 0, i.e., all-zero, which is the orthogonal code. The multiplier 25 multiplies the Walsh code 0 with the PN code supplied from the PN generator 21 and routes the resulting code to the channel adder 30.

The Walsh code generator 23 generates Walsh codes m, where m is a pre-selected integer from 1 to 63. The multiplier 26 multiplies the Walsh codes m with the PN code supplied from the PN generator 21 and sends the resulting product data to the multiplier 28. The multiplier 28 is fed with the interleaved identification information from the interleaving circuit 17. The multiplier multiplies the identification code with and output of the multiplier 26 and routes the resulting data to the channel adder 30.

The Walsh code generator 24 generates Walsh codes k, where k is a pre-selected integer from 1 to 63. The multiplier 27 multiplies the Walsh codes k with the PN code supplied from the PN generator 21 and sends the resulting product data to the multiplier 29. The multiplier 28 is fed with the interleaved identification information from the interleaving circuit 17. The multiplier multiplies the identification code with an output of the multiplier 26 and routes the resulting data to the channel adder 30.

The channel adder 30 sums the outputs of the multipliers 25, 28, 29 and routes the resulting sum data as the transmission data to the modulator 31. Specifically, the channel adder 30 is continuously fed from the base station 1 with a paging message (paging channel) containing the pilot PN code having a period of 1.28 sec $2^N$, where N is not less than 1, as shown for example in FIG. 4A. The channel adder 30 forms a control channel made up of a preamble containing the PN code and data containing the identification information, while outputting this control channel as a control packet at a period shorter than the period of the paging message. The transmission timing of the control packet (control channel) may be varied on the basis of random numbers for avoiding continuous collision of the control packets sent from the other home base station against the control packet transmitted by the HBS 3.

The modulator 31 is comprised of pre-set modulators, for example, a two-phase shift keying (PSK) modulator or a quadrature phase shift keying (QPSK) modulator, and modulates two carrier waves having phase shift of $\pi/2$ from each other with the control channel supplied form the channel adder 30 and with encoded speech data if the mobile unit is being used for talk. The resulting modulated signal is supplied to a high frequency amplifier 32 which then amplifies the modulated signal and sends the amplified signal via antenna 33 to the high frequency amplifier 32. Thus the HBS 3 transmits the control channel at least once during the time since the end of the paging channel intermittently transmitted from the base station 1 until the leading end of the next paging channel.

Figure 5:
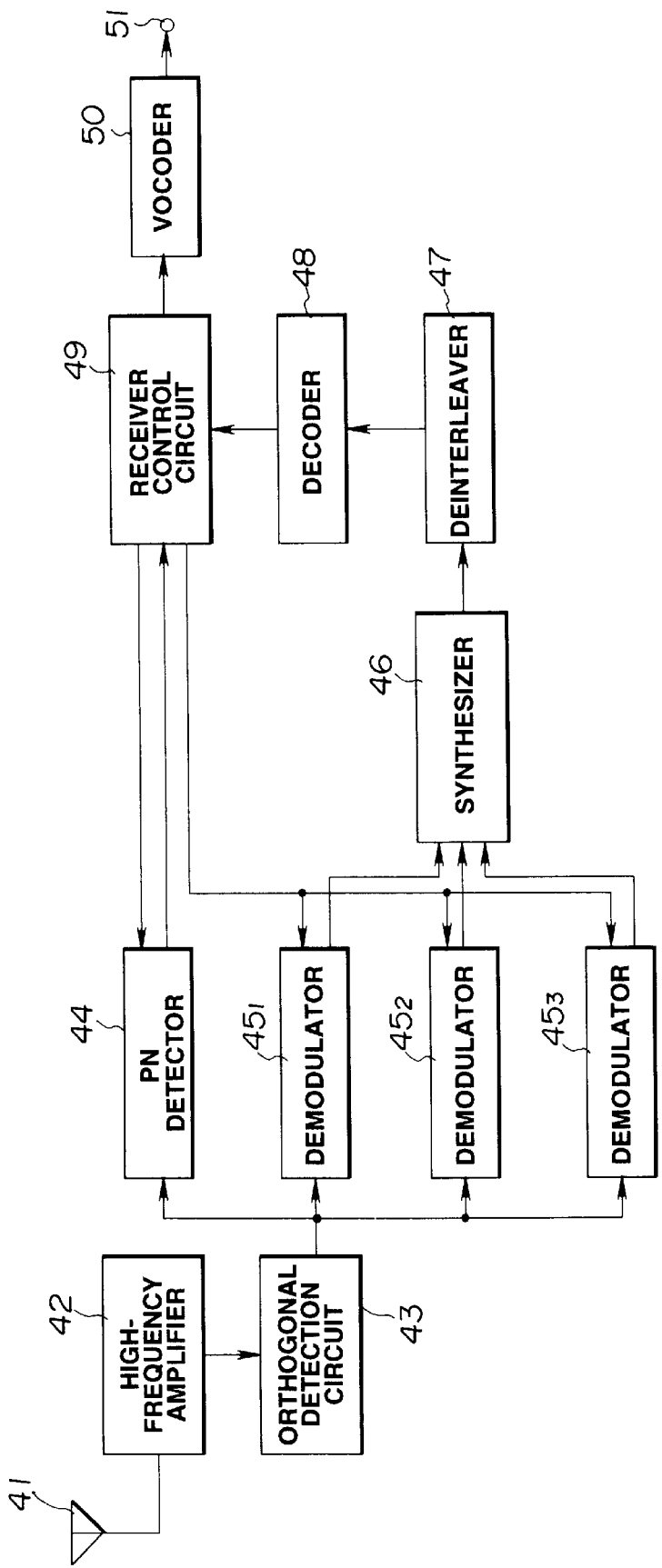
FIG. 5 is a block diagram showing an illustrative arrangement of the receiver of the mobile unit.

Referring now to FIG. 5, an illustrative structure of the mobile unit 2 is explained.

In FIG. 5, the mobile unit 2 has, as its receiving portions, an antenna 41 for receiving modulated signals from the base station 1 and the HBS 3, and a high frequency amplifier 42 received by the antenna 41. The mobile unit 2 also includes an orthogonal detection circuit 43 for converting the high-frequency modulated signal for converting the detected signal into the base-band signal and a PN detection unit 44 for detecting the pilot PN code from the base station 1 and the PN code from the HBS 3. The mobile unit 2 also includes a plurality of, herein three, demodulators $45_1$, $45_2$ and $45_3$ for demodulating the baseband signal from the orthogonal detection circuit 43 and a synthesis unit 46 for synthesizing the outputs of the demodulators $45_1$, to $45_3$. The mobile unit 2 also includes a deinterleaver 47 for deinterleaving the decoded data and a decoder 48 for error-correcting the decoding data. The mobile unit 2 finally includes a receiver control circuit 49 controlling the PN detector 44 and so forth, and a vocoder 50 for reproducing speech data.

In a so-called idling state, the mobile unit 2 receives the paging channel from the base station 1, while receiving the control channel from the HBS 3 in the interstitial periods between the times of reception of the paging channel. If the mobile unit 2 has succeeded in identifying its own HBS 3, it operates in the HBS mode of making a call or accepting a call via this HBS 3, and otherwise operates in the cellular mode of making a call or accepting a call via the base station 1. Stated differently, the mobile unit 2 operates as a slave unit of the cordless telephone in an area capable of having telephone communication with, for example, an indoor HBS 3, that is, it makes a call or accepts a call via an HBS 3 connected to the subscriber network. In an area incapable of having telephone communication, the mobile unit 2 operates as a mobile terminal making a call and accepting a call via the base station 1.

Specifically, the high frequency amplifier 42 amplifies the modulated signal, received over an antenna 41, while the orthogonal detection circuit 43 orthogonally detects the modulated signal and routes the resulting base-band signal to the PN detector 44 and to the amplifiers $45_1$ to $45_3$.

Figure 6:
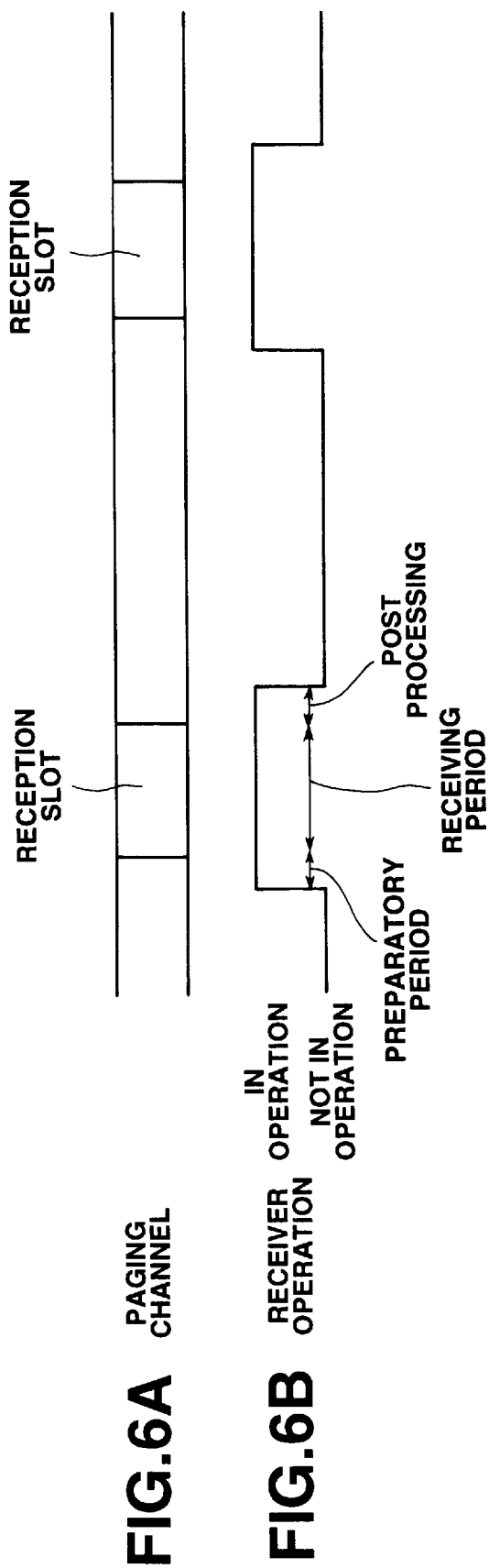
FIGS. 6A and 6B are timing charts for illustrating the transmission of the paging channel of the base station and the operation of the receiving unit.

In the idling state of the receiver of the mobile unit 2, the PN detector 44 monitors the paging channel, under control by the receiver controlling circuit 49, for detecting the pilot PN code. Specifically, the base station 1 transmits a paging message (paging channel) for the mobile unit 2 at a pre-set period, for example, at a period of 1.28 sec $2^N$, where N is not less than 1, as shown for example in FIG. 6A. For monitoring the paging channel, the receiver controlling circuit 49 starts the circuits absolutely necessary for monitoring the paging channel, such as the high-frequency amplifier 42, orthogonal detection circuit 43 or the PN detector 44, shortly before each reception slot, as shown in FIG. 6B. The PN detector 44 detects the pilot PN codes of the paging channel. The receiver control circuit 49 performs paging message processing, such as accepting the call, based on the paging message received from a decoder 48 as later explained. If no processing is required, the receiver control circuit 49 makes preparations for receiving the next paging channel and halts the previously started circuits 42, 43 and 44. The receiver is in operation intermittently responsive to the intermittent transmission of the paging message of the base station 1 for lowering the power consumption.

Moreover, the PN detector 44 detects the PN code of the control channel from the HBS, under control by the receiver control circuit 49, in the interstitial periods of detection of the pilot PN code of the above-described paging channel. Specifically, for receiving the control channel once per reception of one or more of the paging channel(s), the receiver control circuit 49 starts the circuits absolutely necessary for receiving the control channel, such as the high frequency amplifier 42, orthogonal detection circuit 43 or the PN detector 44, each time the paging channel(s) are received a pre-set number of times, as shown for example in FIG. 4D. The PN detector 44 detects the PN code of the control channel, while the receiver control circuit 49 switches between actuation of the mobile unit 2 under the HBS mode and actuation of the unit under the cellular mode, based on the identification information supplied from a decoder 48, as later explained, and halts the circuits started previously.

Figure 4:
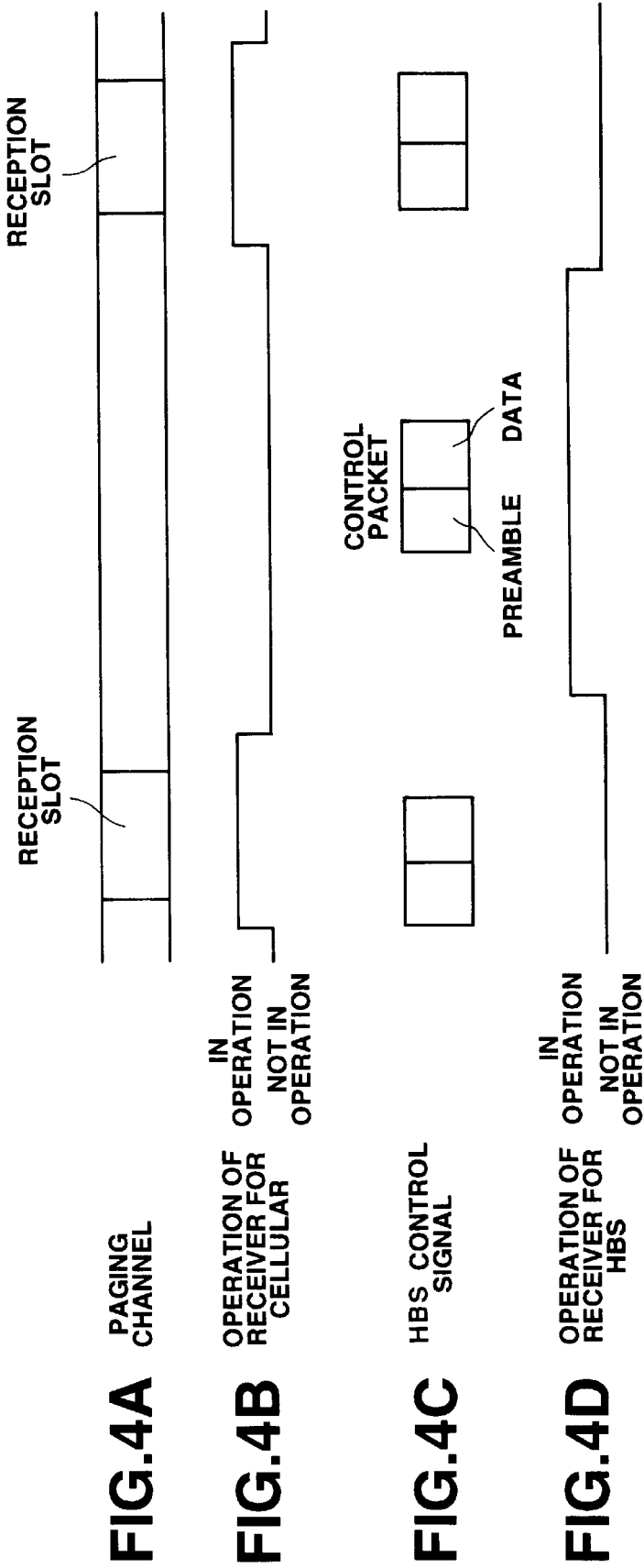
FIGS. 4A to 4D are timing charts showing the operating timing of a receiver of a mobile unit embodying the present invention.
Figure 7:
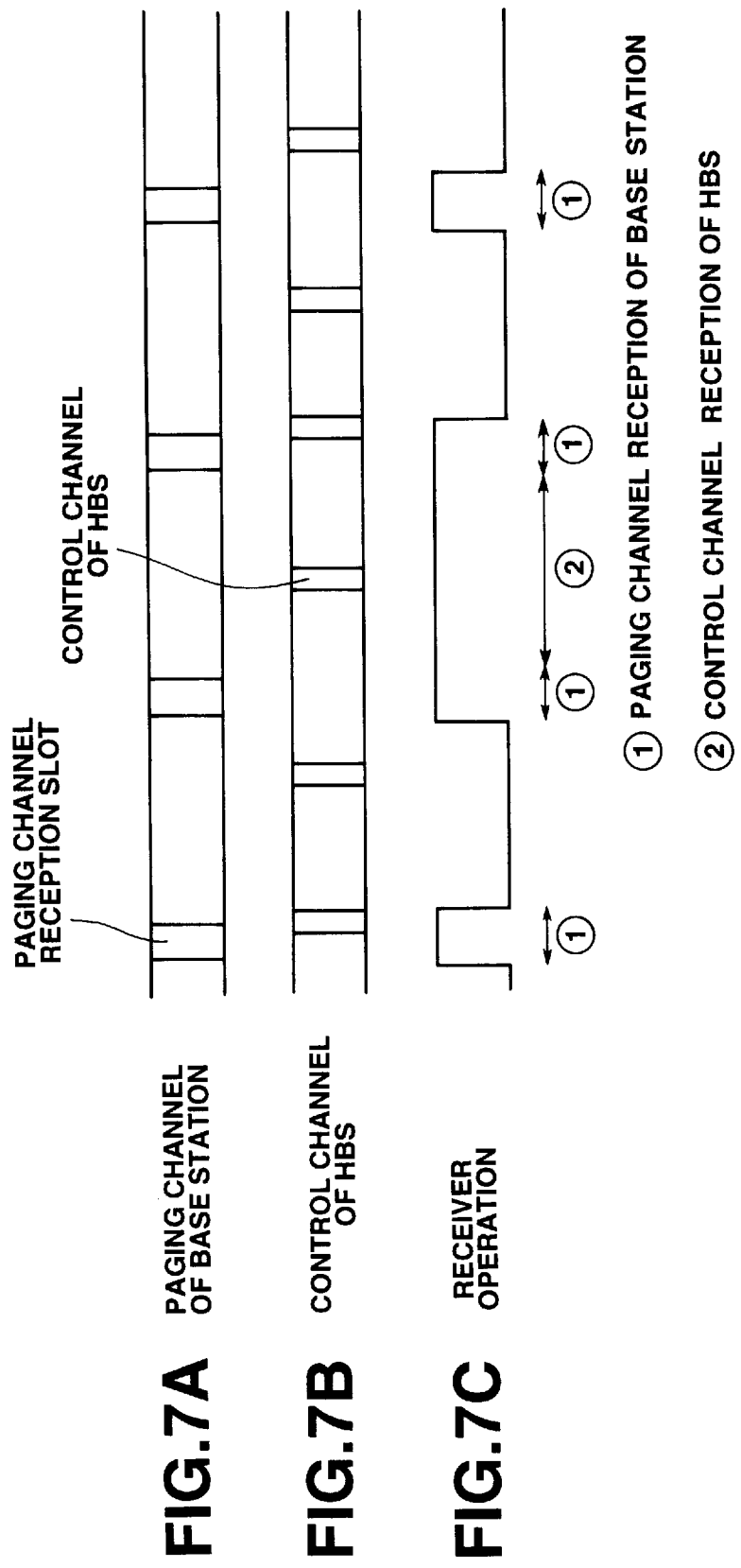
FIGS. 7A to 7C are timing charts for illustrating timing charts for illustrating the relation between the paging channel, control channel and the receiver operation.

That is, the mobile unit 2 performs reception of the control channel from the HBS 3 once every plural interstitial periods, instead of performing such reception in all of the interstitial periods of paging channel reception from the HBS 3, thereby enabling the power consumption otherwise increased by control channel reception. Since the HBS 3 transmits the control channel at a time interval shorter than the time period which elapses since the end of the paging channel until the leading end of the next paging channel, the control channel can be received reliably despite the fact that the control channel is received once every plural receptions by the mobile unit 2. Meanwhile, in the mobile unit 2, the receiver is in operation during the period of transmission of the paging channel and during the period of transmission of the control channel for monitoring the paging channel from the base station 1 and the control channel from the HBS 3, as shown in FIGS. 4B and 4D. However, if the control channel is received, the control channel may be continuously received without transiently halting the receiver after the end of reception of the paging channel, as shown in FIG. 7C.

The demodulator $45_1$, to $45_3$ demodulate the baseband signals, using the pilot PN code or the PN code, and sends the resulting demodulated signal, such as signals corresponding to the data of the pilot channel, data of the sync channel, data of the paging channel and data of the traffics channel, or signals corresponding to data of the control channel from the HBS 3 or the data of the traffics channel, to the synthesizer 46. The synthesizer 46 synthesizes outputs of the demodulators $45_1$ to $45_3$ and converts the demodulated signal into bi-level signal by, for example, viterbi decoding. The resulting decoded data is supplied to a deinterleaver 47. Specifically, there exist multiple paths in the radio transmission channel in general and the PN codes are detected at plural timings. Therefore, if there exist multiple paths, the receiver control circuit 49 actuates plural demodulators having PN codes different in phase or timing for demodulation. The synthesizer 46 synthesizes the demodulated signals supplied from the demodulator $45_1$ to $45_3$ and generates decoded data from the demodulated signal improved in the S/N ratio.

The deinterleaver 47 and the decoder 48 are counterpart devices of the interleaving circuits 14, 17 and the encoding circuits 13, 16 of the HBS 3, respectively. The deinterleaver 47 deinterleaves the decoded data supplied from the synthesizer 46, while the decoder 48 corrects the decoded data for errors and routes the error-corrected data to the receiver control circuit 49. The receiver control circuit 49 controls the operating mode of the mobile unit 2 or the acceptance of the call, while transmitting the decoded data from the decoder 48 to a vocoder 50.

The vocoder 50 is associated with the encoder of the base station 1 or the HBS 3 and decodes the received encoded speech data during talk while routing the resulting speech data via a terminal 51 to, for example, a digital/analog converter, not shown. The speech data is converted by the digital/analog converter into speech signals which are supplied to a speaker in order to permit the user to have a talk over the telephone.

Figure 8:
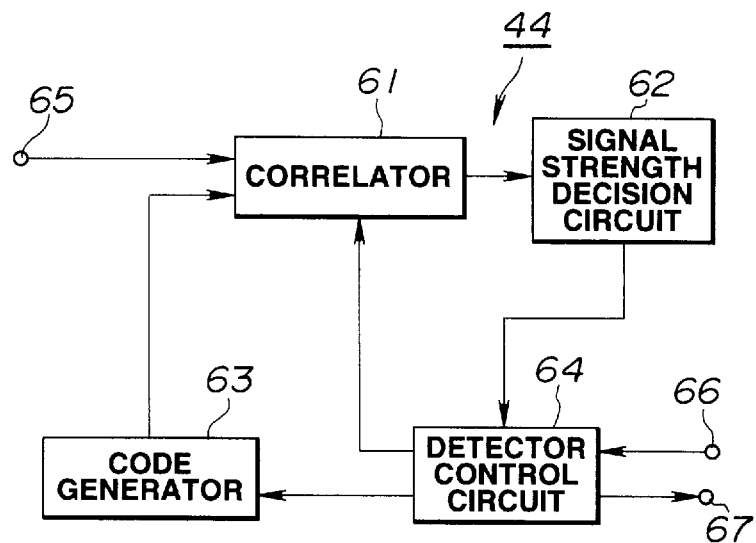
FIG. 8 is a block diagram showing an illustrative arrangement of a PN detector of the mobile unit.

Referring to FIG. 8, an illustrative arrangement of the PN detector 44 is explained.

In FIG. 8, the PN detector 44 has a correlation unit 61 for detecting the pilot PN code from the base station 1 or the PN code of a shorter period from the base station 3, and a signal strength decision circuit 62 for comparing the relation of correlation from the correlation unit 61 to a pre-set threshold. The PN decoder also includes a PN code generator 63 for generating the pilot PN code or the PN code for routing the generated codes to the correlation unit 61 and a PN detector control circuit 64 for controlling the PN code generator 63.

The PN detector control circuit 64 manages control for varying the timing of the pilot PN code or the PN code based on the control signal which is supplied from the receiver control circuit 49 and which specifies the timing of the previously received pilot PN code or PN code.

The PN code generator 63 switches between the pilot PN code and the PN code, under control by the PN detector control circuit 64, and varies the timings of generation of these codes.

Figure 9:
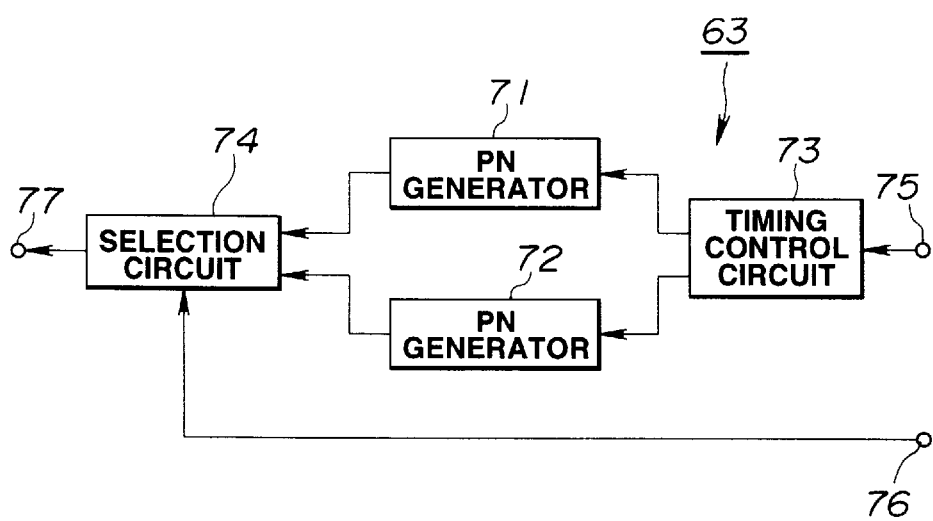
FIG. 9 is a block diagram showing an illustrative arrangement of a PN code generator of a PN detector.

Referring to FIG. 9, the PN code generator 63 includes a PN generator 71 for generating the PN code which is the same as the pilot PN code transmitted by the base station 1, and a PN generator 72 for generating the PN code which is the same as the PN code transmitted by the HBS 3. The PN code generated by PN generator 71 is also termed the pilot PN code. The PN code generator 63 also includes a timing controller 73 for controlling the PN generators 71, 72, and a selection circuit 74 for making switching selection between the pilot PN code from the PN generator 71 and the PN code from the PN generator 72.

The timing control circuit 73 controls the PN generators 71 and 72 based on the timing control signal supplied from the PN detector control circuit 64 via a terminal 75. Thus the PN generator 71 generates the pilot PN code based on the timing of the previously received pilot PN code, while the PN generator 72 generates the PN codes based on the timing of the previously received PN code. The selection circuit 74 makes switching selection between the pilot PN code from the PN generator 71 and the PN code from the PN generator 72, based on the switching signal supplied from the PN detector control circuit 64 via a terminal 76, and routes the selected PN code to the correction unit 61 via a terminal 77. The PN generator not in use may be halted based on the switching signal.

The correlation unit 61 takes the correlation between the baseband reception signals supplied from the orthogonal detection circuit 43 via a terminal 65 and the pilot PN code from the PN code generator 63 and routes the results of correlation to the signal strength decision circuit 62.

The signal strength decision circuit 62 compares the result of correlation to a pre-set threshold value. If the result of correlation is larger than the threshold value, it is assumed that the pilot PN code or the PN code has been detected, and the result of detection is routed to the PN detector control circuit 64. The PN detector control circuit 64 routes the result of detection and the detection timing of the pilot PN code or the PN code via a terminal 67 to the receiver control circuit 49 (FIG. 5). The receiver control circuit 49 controls the demodulators $45_1$ to $45_3$ (FIG. 5) based on this timing while controlling the operational mode of the mobile unit 2 based on the results of detection. The receiver control circuit 49 routes the timing of the pilot PN code or the PN code to the PN detector control circuit 64 at the time of detection of the next pilot PN code or the PN code. That is, by detecting the PN code based on the timing of the previously received PN code, the PN code can be detected in a shorter time.

The above is the manner of detecting the PN code by the PN detector 44. Since the HBS 3 detects the PN code, while the HBS 3 routes the PN code having a period shorter than the period of the pilot PN signal from the base station 1, the PN detector 44 can detect the PN code in a shorter time. Stated differently, the preamble length of the control channel (control packet) can be shortened, so that, if the mobile unit 2 is situated in proximity to the HBS 3 situated indoors, the mobile unit 2 can reliably receive the control channel from the HBS 3 during the interstitial time periods of reception of the paging channel.

Figure 11:
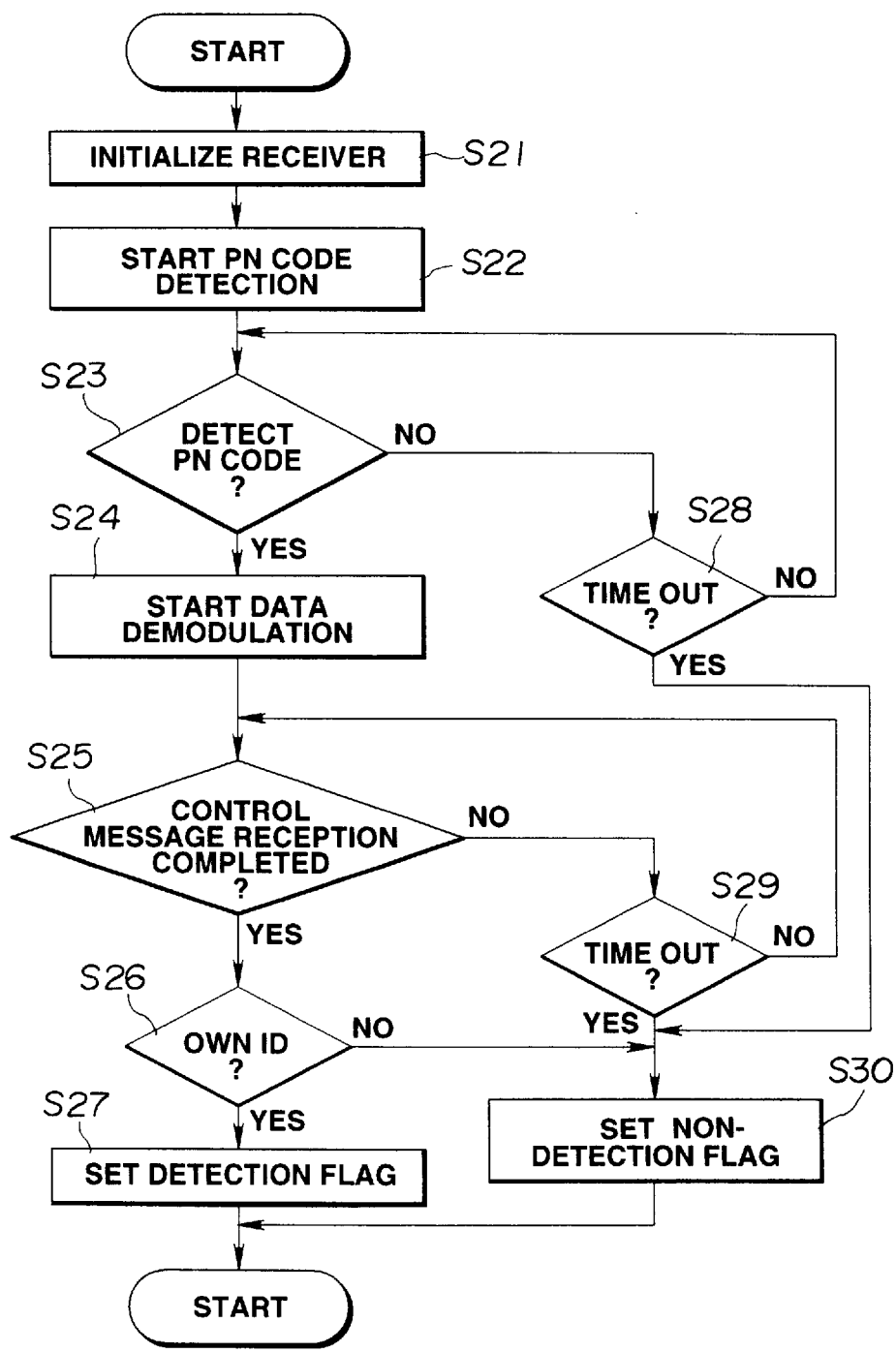
FIG. 11 is another flowchart for illustrating the operating mode switching operation of a mobile unit.

Referring to FIG. 11, switching between the cellular mode and the HBS mode will be explained. The receiver control circuit 49 controls the operational mode of the mobile unit 2.

At step S1, the receiver control circuit 49 starts the operation of the receiver for receiving the paging channel from the base station 1 or the control channel from the HBS 3. The control circuit 49 then proceeds to step S2.

At step S2, the receiver control circuit 49 receives the paging channel before proceeding to step S3.

At step S3, the receiver control circuit 49 judges whether or not a call has been accepted on the basis of the paging channel control information (paging message) supplied from the decoder 48. If the result of judgment at step S3 is YES, processing transfers to step S4 and, if otherwise, processing transfers to step S5.

At step S5, the receiver control circuit 49 increments the value of the counter storing the number of received paging channels before proceeding to step S6.

At step S6, the receiver control circuit 49 judges, based on the counter value, whether the timing is that of receiving the control channel. If the result of judgment at step S6 is YES, processing transfers to step S7 and, if otherwise, processing transfers to step S11.

At step S7, the receiver control circuit 49 receives the control channel from the HBS 3 before proceeding to step S8.

At step S8, the receiver control circuit 49 judges, based on the identification information of the control channel supplied from the decoder 48, whether or not the HBS 3 is that associated with the mobile unit 2, as will be explained subsequently. If the result of judgment at step S8 is YES, the receiver control circuit 49 proceeds to step S9 and, if otherwise, the control circuit 49 proceeds to step S10.

At step S9, the receiver control circuit 49 sets the HBS mode, that is a mode of making a call and accepting a call via the HBS 3.

At step S10, the receiver control circuit 49 initializes, that is zeroes, the above-mentioned counter, before proceeding to step S11.

At step S11, the receiver control circuit 49 judges whether the timing is that of receiving the next paging channel. If the result of judgment is YES, the receiver control circuit 49 proceeds to step S2 and, if otherwise, the receiver control circuit reiterates step S11.

At step S21 shown in FIG. 11, the receiver control circuit 49 starts the operation of the receiver and initializes the receiver, such as by controlling the PN detector control circuit 64 for generating the PN code. The receiver control circuit 19 then proceeds to step S22.

At step S22, the receiver control circuit 49 starts the detection of the PN code from the HBS 3, before proceeding to step S23.

At step S23, the receiver circuit 49 judges whether or not the PN code has been detected. If the result of judgment at step S23 is YES, the control circuit proceeds to step S24 and, if otherwise, to step S28.

At step S24, the receiver control circuit 49 makes control operations, such as demodulation by the demodulators $45_1$ to $45_3$, using the PN code, before proceeding to step S25.

At step S25, the receiver control circuit 49 judges whether or not reception of a control message such as the control information, has come to a close. If the result of judgment at step S25 is YES, the control circuit 49 proceeds to step S26 and, if otherwise, to step S29.

At step S26, the receiver control circuit 49 decides whether or not the identification information ID supplied from the decoder 48 is its own identification information ID. If the result of judgment is YES, the receiver control circuit 49 proceeds to step S27 and otherwise to step S30.

At step S27, the receiver control circuit 49 sets a detection flag indicating that the associated HBS 3 has been confirmed.

At step S28, the receiver control circuit 9 judges whether or not the time period in which to receive the control channel has elapsed. If the result of judgment at step S28 is YES, the receiver control circuit 49 proceeds to step S30 and, if otherwise, the receiver control circuit reverts to S25.

At step S30, the receiver control circuit 49 sets a non-detection flag specifying that the associated HBS 3 has not been identified.

Figure 10:
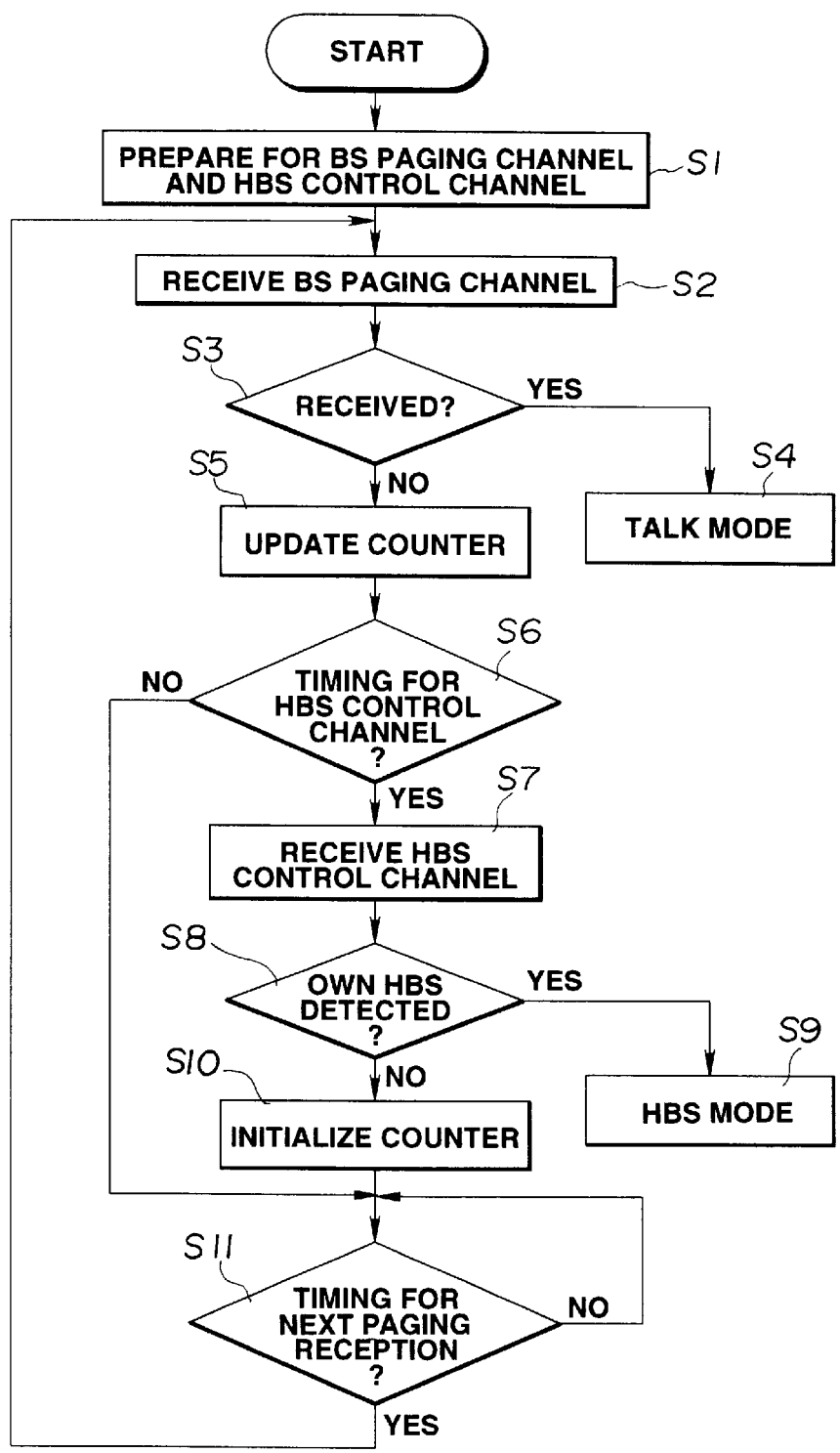
FIG. 10 is a flowchart for illustrating the operating mode switching operation of a mobile unit.

That is, at step S7 of FIG. 10, the receiver control circuit 49 sets the detection flag or the non-detected flag, and detects the HBS 3 at step S8 based on these flags.

It will be seen from the foregoing that, with the mobile communication system according to the present invention, the HBS 3 connected to the subscriber network transmits N periods of the PN code having a period shorter than that of the pilot PN code sent from the base station 1 and the identification information for identifying the respective home base stations 3, as the control channel. If, based on the identification information of the control channel received from the HBS 3, the mobile unit 2 can identify the pertinent HBS, it makes a call or accepts a call via the HBS 3. If otherwise, the mobile unit 2 makes a call or accepts a call via the base station 1. Thus the mobile unit 2 can receive the control channel from the HBS 3 in a short time.

Moreover, since the HBS 3 transmits the control channel in a time duration shorter than the time interval which elapses since the end of the paging channel intermittently transmitted from the base station 1 until the leading end of the next paging channel, it becomes possible for the mobile unit 2 to receive the control channel in the interstitial period between the reception operations of the paging channel.

Since the HBS 3 varies the timing of transmission of the control channel based on the random number, it becomes possible to prevent continuous collision of a control packet transmitted by other home base stations in operation with a control packet transmitted by the HBS 3.

In addition, since the mobile unit 2 intermittently receives the paging channel transmitted by the base station 1, while receiving the control channel from the HBS 3 during the period in which it is not receiving the paging channel, the mobile station 2 can receive the control channel from the HBS 3 reliably, while it becomes possible to reduce power consumption.

Since the mobile unit 2 receives the control channel each time it receives plural paging channels, the power consumption can be reduced correspondingly.

The present invention is not limited to the above-described embodiments. For example, the plural home base stations 3 can transmit control channels of respective different PN codes. In such case, the mobile unit 2 can identify the pertinent HBS by referring to the PN code of the control channel.

I claim:

1. A method for mobile communication between a base station and a plurality of mobile units by a code division multiple connection system including a plurality of fixed stations connected to a subscriber network in association with said plurality of mobile units, the method comprising the steps of:

transmitting as a control channel from the plurality of fixes stations N periods of PN codes shorter in period than a pilot PN code transmitted from the base station, N being not less than 1, and identification information for identifying the plurality of fixed stations;

making or accepting a call via one of said plurality of fixed stations, if one of said plurality of fixed stations has been confirmed by one of said plurality of mobile units to be said one of said plurality of stations associated with said one of said plurality of mobile units, based on the identification information of a control channel received by said one of said plurality of fixed stations; and making or accepting a call via said base station, if one of said plurality of fixed stations has not been confirmed to be said one of said plurality of stations associated with said one of said plurality of mobile units.

2. The method for mobile communication as claimed in claim 1 comprising the further step of causing said one of said plurality of fixed stations to transmit said control channel in a time interval shorter than a time which elapses since an end of a paging channel intermittently transmitted from the base station until a leading end of a next paging channel.

3. The method for mobile communication as claimed in claim 1 comprising the further step of causing said one of said plurality of fixed stations to vary the timing of transmitting the control channel based on random numbers.

4. The method for mobile communication as claimed in claim 1 comprising the further steps of:
intermittently receiving at said mobile unit a paging channel transmitted from the base station; and
receiving the control channel from said one of said plurality of fixed stations during a period of not receiving the paging channel.

5. The method for mobile communication as claimed in claim 4 comprising the further step of causing said one of said plurality of mobile units to receive said control channel each time said one of said plurality of mobile units receives plural paging channels.

6. The method for mobile communication as claimed in claim 1 including the further step of causing said plurality of fixed stations to transmit control channels of respectively different PN codes.

7. A system for mobile transmission for having communication between a base station and a plurality of mobile units by a code division multiple connection system, comprising:
a plurality of fixed stations for transmitting N periods of a PN code shorter in period than a pilot PN code transmitted from the base station, as a control channel, N being not less than 1, and for transmitting identification information for identifying the plurality of fixed stations, as a control channel, said plurality of fixed stations being associated with said plurality of mobile units and being connected to a subscriber network; and
a plurality of mobile units which, if one of said plurality of fixed stations has been confirmed by one of said plurality of mobile units to be said one of said plurality of fixed stations associated with said one of said plurality of mobile units, based on the identification information of the control channel received by said one of said plurality of fixed stations, makes or accepts a call via said one of said plurality of fixed stations and, if otherwise, makes or accepts a call via said base station.

8. The system for mobile communication as claimed in claim 7 wherein said one of said plurality of fixed stations transmits said control channel in a time interval shorter than a time which elapses since an end of a paging channel intermittently transmitted from said base station until a leading end of a next paging channel.

9. The system for mobile communication as claimed in claim 7 wherein said one of said plurality of fixed stations varies the timing of transmitting the control channel based on random numbers.

10. The system for mobile communication as claimed in claim 7 wherein said one of said plurality of mobile units intermittently receives a paging channel intermittently transmitted from the base station, said one of said plurality of mobile units receiving the control channel from said one of said plurality of fixed stations during a period of not receiving the paging channel.

11. The apparatus for mobile communication as claimed in claim 10 wherein one of said plurality of mobile units receives said control channel each time said one of said plurality of mobile units receives a plurality of said paging channels.

12. The apparatus for mobile communication as claimed in claim 7 wherein said plurality of fixed stations transmit control channels of respectively different PN codes.

13. An apparatus in a mobile communication system designed for having communication between a base station and a plurality of mobile units by a code division multiple connection system, said apparatus having radio communication with said mobile unit, comprising:
PN code generating means for generating a PN code shorter in period than a pilot PN code transmitted from the base station;
identification information generating means for generating identification information for identifying a plurality of fixed stations; and
control channel transmitting means for transmitting N periods of the PN code from said PN code generating means, N being not less than 1, and the identification information from said identification information generating means, as a control channel.

14. The apparatus as claimed in claim 13 wherein the fixed station transmits said control channel in a time interval shorter than a time which elapses since an end of the paging channel intermittently transmitted from said base station unit a leading end of a next paging channel.

15. The apparatus as claimed in claim 13 wherein the control channel transmitting means varies the timing of transmitting the control channel based on random numbers.

16. The apparatus as claimed in claim 13 wherein said PN code generating means generates the PN code different from one fixed station to another.

17. An apparatus in a mobile communication system in which communication is established between a base station and a plurality of the mobile units by a code division multiple connection system, comprising:
reception means for receiving a paging channel from said base station and for receiving N periods, N being not less than 1, of PN codes shorter in period than a pilot PN code, and identification information for identifying a plurality of fixed stations associated with the plurality of mobile units as a control channel;
PN code detection means for detecting the PN codes of the control channel received by said reception means;
demodulation means for demodulating the identification information of said control channel based on a result of detection of said PN code detection means; and
control means managing control for making a call or accepting a call via one of said plurality of fixed stations if said one of said plurality of fixed stations has been confirmed by one of said plurality of mobile units to be said one of said plurality of fixed stations associated with said one of said plurality of mobile units based on the identification information from the demodulation means, said control means managing control for making or accepting a call via said base station otherwise.

18. The apparatus as claimed in claim 17 wherein said one of said plurality of fixed stations transmits said control channel in a time interval shorter than a time which elapses since an end of the paging channel intermittently transmitted from said base station until a leading end of a next paging channel;
said control means controlling said PN code detection means for detecting the PN codes of said control channel.

19. The apparatus as claimed in claim 17 wherein said one of said plurality of fixed stations varies the timing of transmission of the control channel based on random numbers, and wherein said control means controls the PN code detection means for detecting the PN codes of said control channel.

20. The apparatus as claimed in claim 17 wherein said control means controls said reception means so that said reception means receives the paging channel intermittently transmitted from the base station, and so that said reception means receives the control channel from said base station during a period of not receiving the paging channel.

21. The apparatus as claimed in claim 20 wherein said control unit controls said one of said plurality of mobile units for receiving said control channel each time said one of said plurality of mobile units receives plural paging channels.

22. The apparatus as claimed in claim 17 wherein said one of said plurality of fixed stations transmits control channels of the respectively different PN codes and wherein said PN code detection means detects only one of said respectively different PN codes allocated to an associated one of said plurality of fixed stations.

* * * * *